United States Patent
Spaans et al.

(10) Patent No.: US 7,597,771 B2
(45) Date of Patent: Oct. 6, 2009

(54) PULTRUSION METHOD AND RELATED ARTICLE

(75) Inventors: Robert D. Spaans, Perrysburg, OH (US); Jacob J. Huskins, Toledo, OH (US); John L. Sigmund, Holland, OH (US); Robert W. Jennings, Morenci, MI (US)

(73) Assignee: Comfort Line Ltd., Toledo, OH (US)

( * ) Notice: Subject to any disclaimer, the term of this patent is extended or adjusted under 35 U.S.C. 154(b) by 339 days.

(21) Appl. No.: 11/348,806

(22) Filed: Feb. 7, 2006

(65) Prior Publication Data

US 2007/0183843 A1  Aug. 9, 2007

(51) Int. Cl.
B29C 70/52 (2006.01)
B05C 3/12 (2006.01)

(52) U.S. Cl. .............. 156/166; 156/245; 264/137; 427/434.6; 118/405; 118/420

(58) Field of Classification Search ............... 156/166, 156/180, 245, 433, 441; 264/136, 137; 118/405, 118/419, 428, 420; 427/434.4, 434.6, 434.7
See application file for complete search history.

(56) References Cited

U.S. PATENT DOCUMENTS

| | | | |
|---|---|---|---|
| 3,130,104 A | | 4/1964 | Lewis et al. |
| 3,529,050 A | * | 9/1970 | Smith ............... 264/137 |
| 3,642,310 A | | 2/1972 | Hudson |
| 3,895,896 A | | 7/1975 | White et al. |
| 4,394,338 A | * | 7/1983 | Fuwa ................ 264/135 |
| 4,487,569 A | | 12/1984 | Hehl |
| 4,495,021 A | | 1/1985 | Goldsworthy |
| 4,561,227 A | | 12/1985 | Austin |
| 4,565,153 A | * | 1/1986 | Corley .............. 118/405 |
| 4,572,694 A | | 2/1986 | Hocksema |
| 4,630,550 A | | 12/1986 | Weitzman |
| 4,643,126 A | * | 2/1987 | Wilkinson et al. ..... 118/405 |
| 4,681,722 A | * | 7/1987 | Carter et al. ......... 264/171.11 |
| 4,752,513 A | | 6/1988 | Rau et al. |
| 4,872,297 A | | 10/1989 | Hetzel et al. |
| 4,875,311 A | | 10/1989 | Meyers |
| 4,924,631 A | | 5/1990 | Davies et al. |
| 5,120,380 A | * | 6/1992 | Strachan ............ 156/164 |
| 5,143,472 A | | 9/1992 | Reed et al. |
| 5,492,743 A | * | 2/1996 | Schroll et al. ........ 428/36.9 |
| 5,647,172 A | | 7/1997 | Rokicki |
| 5,685,662 A | | 11/1997 | Rollin et al. |
| 5,747,075 A | | 5/1998 | Gauchel et al. |
| 5,766,357 A | * | 6/1998 | Packer et al. ......... 118/420 |
| 5,794,395 A | | 8/1998 | Reed |
| 5,850,843 A | | 12/1998 | Mahood et al. |
| 5,948,473 A | * | 9/1999 | Saito et al. .......... 427/289 |

(Continued)

*Primary Examiner*—Richard Crispino
*Assistant Examiner*—Michael A Tolin
(74) *Attorney, Agent, or Firm*—Brooks Kushman P.C.

(57) ABSTRACT

A method of forming a reinforced composite structure comprises providing a plurality of fiberglass rovings to a resin applicator. The plastic applicator has an inlet, an outlet, and a plastic applicator cavity such that the rovings enter the plastic applicator through the inlet and exit through the outlet. The inlet and outlet are relatively positioned to spread out the rovings. Resin-containing rovings are directed between a first fiberglass matt and a second fiberglass matt and then cured. A joint that connects two frame members formed by the method of the invention is provided.

16 Claims, 11 Drawing Sheets

U.S. PATENT DOCUMENTS

| | | | |
|---|---|---|---|
| 5,954,904 A * | 9/1999 | Rokicki | 156/180 |
| D419,431 S | 1/2000 | Hollis | |
| 6,221,161 B1 * | 4/2001 | Killingbeck et al. | 118/420 |
| 6,272,796 B1 | 8/2001 | Metzler | |
| 6,676,870 B1 * | 1/2004 | Hattori et al. | 264/141 |
| 6,694,700 B1 | 2/2004 | Mackett | |
| 6,807,787 B1 | 10/2004 | Ross | |
| 2002/0121722 A1 * | 9/2002 | Davies et al. | 264/129 |

* cited by examiner

PULTRUSION METHOD AND RELATED ARTICLE

BACKGROUND OF THE INVENTION

1. Field of the Invention

The present invention relates to methods of forming frame members having high reinforcement concentrations and complex cross-sections by pultrusion and to articles formed therein.

2. Background Art

Pultrusion is a process in which reinforced solid or hollow plastic structures of uniform cross-section are formed in a continuous manner. In the pultrusion process, a fiber reinforced material is pulled through an open resin impregnation bath and then a shaping die in which the resin is subsequently cured. In the final step, the pultruded structure is sawed off at a desired length. Typically, pulling is accomplished by a continuous belt or reciprocating clamping system at speeds from about 0.5 to about 2 m/minute. The resin must cure quickly because of the high speed and continuous nature of the process.

In general, pultruded structures are elongated structures of uniform cross-section. Reinforcements are usually added and aligned along the elongated direction. Other reinforcement types include continuous filament mats and fabrics, which provide transverse reinforcement, and veils for surface finish. Several suitable guiding systems positioned between creels and the curing die, allow the shaping and placement of each reinforcement type at the right location Due to the continuous nature of the pultrusion process, composites of any desired length can be produced. Pultruded parts are used in electrical, corrosion resistant, building and consumer goods applications. Commercial applications for pultruded structures include structural shapes like I-beams, channel sections, tool handles, and window framing.

As set forth above, pultruded objects typically include reinforcements which enhance the mechanical strength of such structures. Commonly used reinforcements include glass, carbon and aramid fibers. When present, the glass reinforcements range from 30 to 70% by weight. Glass reinforcements which provide longitudinal reinforcement are usually added as single-end rovings arranged in one or more creels. Fillers may also be combined in the pultrusion process to provide additional properties to pultruded parts. Such fillers include, for example, fillers that provide fire retardancy, color, cost reduction, and the like.

Although the pultrusion process is one of the most cost-effective methods for the production of composite materials, there are still a number of areas open for improvement. For example, the open nature of the resin impregnation bath presents environmental issues as well as production efficiency issues. The prior art pultrusion methods in general are not able to form frame members for building enclosure applications that have the requisite combination of properties—mechanical strength, aesthetically pleasing surface finish, and cost effective production. Accordingly, building enclosures typically are formed from vinyl covered aluminum frame members with the aluminum providing strength and the vinyl providing an aesthetically pleasing appearance.

Accordingly, there exists a need in the prior art for pultrusion methods that produce frame members with suitable strength and appearance for building enclosure applications.

SUMMARY OF THE INVENTION

The present invention solves one or more problems of the prior art, by providing in one embodiment a method of forming a reinforced fiberglass-plastic composite structure. The method of the invention comprises providing a plurality of fiberglass rovings to a resin applicator. The plastic applicator has an inlet, an outlet, and a plastic applicator cavity such that the rovings enter the plastic applicator through the inlet and exit through the outlet. Characteristically, the inlet and outlet are relatively positioned to spread out the rovings. Moreover, the rovings are embedded with a liquid resin within the plastic applicator cavity to form resin-containing rovings. At least a portion of the resin-containing rovings are directed between a first fiberglass matt and a second fiberglass matt. Next, the resin-containing rovings, the first fiberglass matt, and the second resin-containing matt are directed into a curing chamber. Subsequently, the resin-containing rovings positioned between the first and second fiberglass matts are cured to form the fiberglass-plastic composite structure. The reinforced plastic composite structure emerges from the curing chamber at a predetermined linear speed.

In another embodiment of the invention, a joint that connects two frame members together is provided. The joint of this embodiment includes a first frame member attached to a second frame member via a fastener. The fastener of this embodiment has a body section, one or more flange sections extending from the body section, an insert section extending from the body section, and an angled stop surface defined by a surface of the body section. Characteristically, the angled stop surface is oriented at a mating angle that matches the angle of an end second frame member such that when the insert section is positioned within the interior cavity the first end is adjacent to the angled stop surface.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventor.

As used herein, "frame members" refers to any beam, girder, or channel structures that can be attached together in a network to form a window or a building enclosure.

Figure 1B:
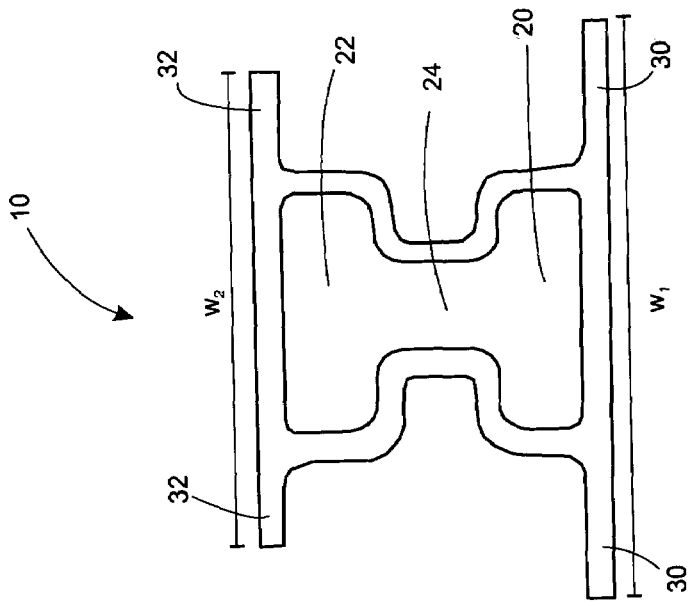
FIG. 1B is a cross-sectional view of a frame member made by an embodiment of the method of the invention.
Figure 1A:
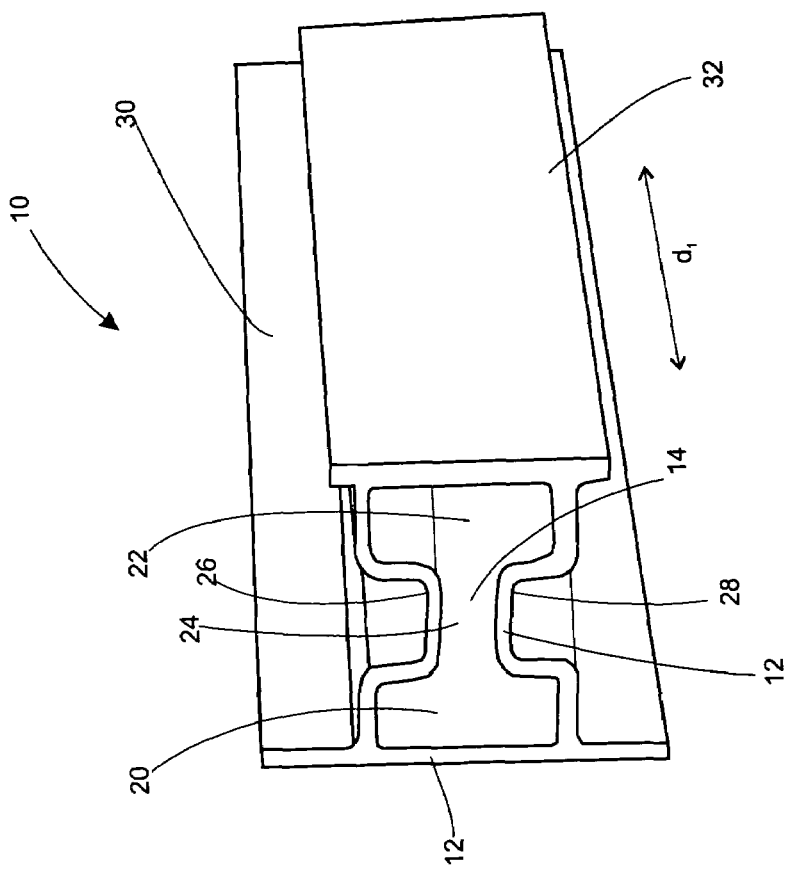
FIG. 1A is a perspective view of a frame member made by an embodiment of the method of the invention.

In one embodiment of the present invention, a method of forming a fiber reinforced article is provided. The method of the present invention is capable of forming any such article so long as the article has a uniform cross-section. In particular, the method of the present invention is particularly useful in forming frame members and beams that are used to construct building enclosures. Such building enclosures include, for example, patios, sunrooms, green houses, and the like. With reference to FIGS. 1A and 1B, illustrations of a representative frame member produced by the method of the present invention are provided. Frame member 10 is extended along direction $d_1$ having a uniform cross-section as shown in FIG. 1B. Wall 12 of enclosure 10 defines hollow cavity 14 which extends along direction $d_1$. Hollow cavity 14 includes rectangular cavity section 20, 22 and central cavity section 24. Rectangular cavity section 20, 22 and central cavity section 24 together are arranged in a shape resembling the letters I or H with indentations 26, 28. Wall sections 30, 32 overhang rectangular sections 20, 22 in a flange-like manner. Wall section 30 is characterized by width $w_1$ and wall section 32 is characterized by width $w_2$ where $w_1$ is greater than $w_2$.

Figure 2:
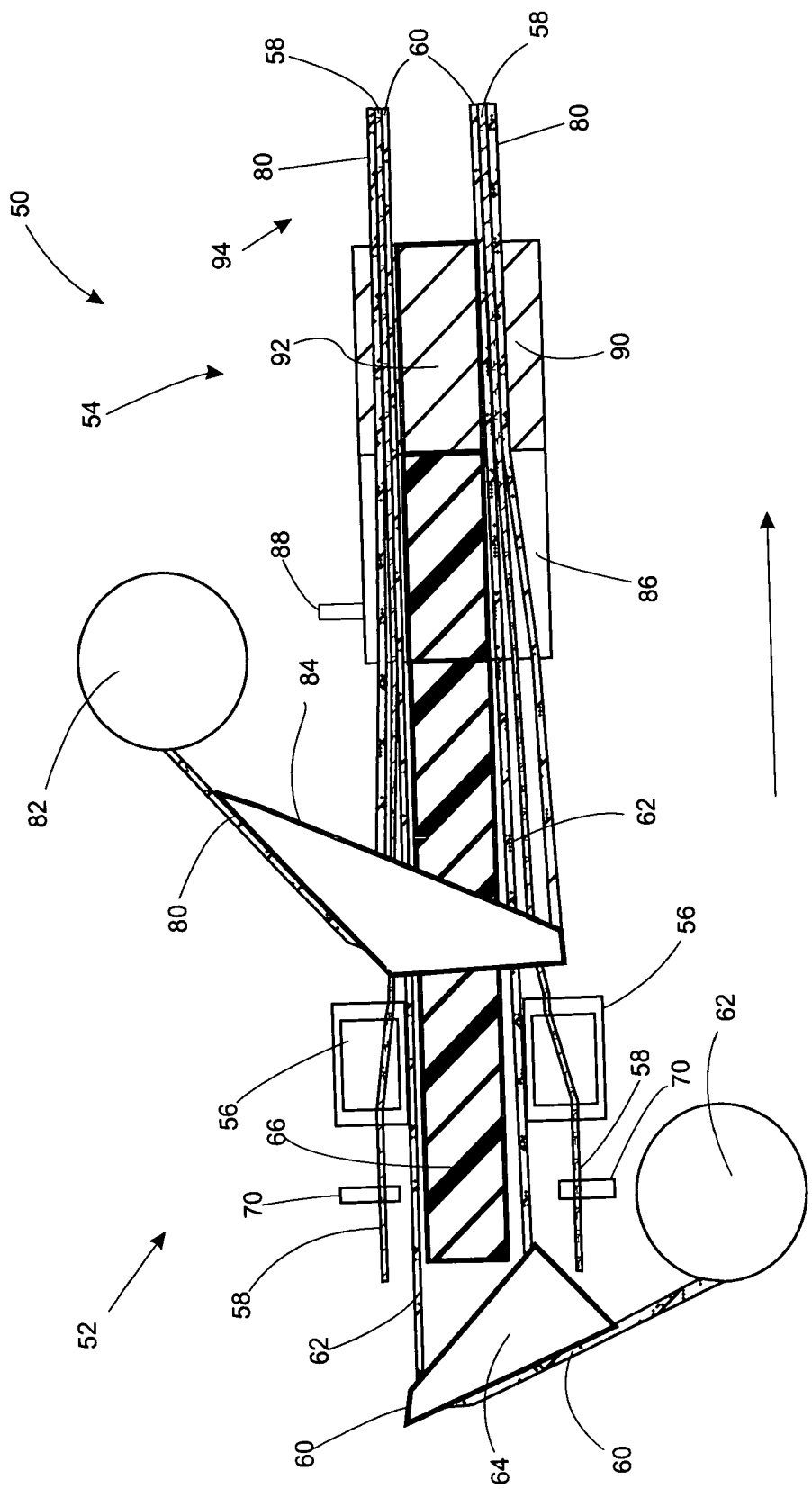
FIG. 2 is an idealized schematic of a pultrusion system of the invention.
Figure 3:
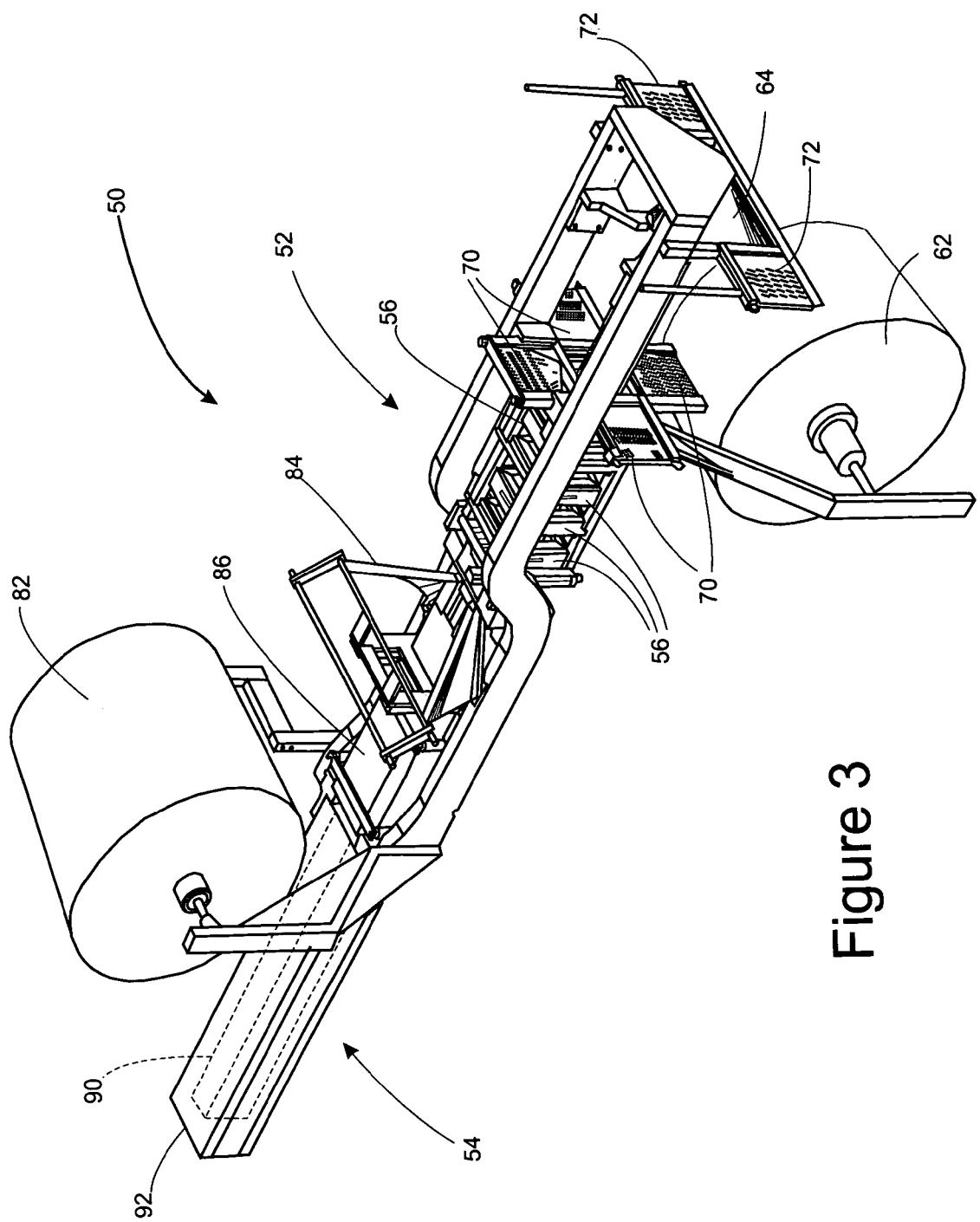
FIG. 3 is a perspective view of an apparatus implementing the methods of the invention.

With reference to FIGS. 2 and 3, schematics of a pultrusion system implementing the method of the invention are provided. FIG. 2 is an idealized schematic of a pultrusion system of the invention. FIG. 3 is a perspective view of an apparatus implementing the methods of the invention. Pultrusion system 50 includes preform section 52 and curing section 54. Preform section 52 includes resin applicators 56 which applies a resin to a plurality of fiberglass rovings 58 (only a few representative rovings are illustrated). Fiberglass rovings 58 are typically provided from a plurality of creels (not shown). First fiberglass matt 60 is provided from roll 62 to forming collar 64. First fiberglass matt 60 is subsequently folded to form a hollow cavity via forming collar 64. Mandrel 66 is located within this cavity. Fiberglass rovings 58 are positioned about and proximate to first fiberglass matt 60. The positioning of fiberglass rovings 58 about fiberglass matt 60 is mediated by carding plates 70, 72 which include a plurality of holes through which fiberglass rovings 58 travel. Resin applicators 56 each have an inlet, an outlet, and a resin applicator cavity. Fiberglass rovings 58 enter resin applicators 56 through the inlet, and exit through the outlet such that the inlet and outlet are relatively positioned to spread out fiberglass rovings 58. Fiberglass rovings 58 are embedded with a liquid resin within the plastic applicator cavity to form resin-containing rovings. Also within preform section 52, second fiberglass matt 80 is provided from matt roll 82. Second fiberglass matt 80 moves along forming collar 84 and is subsequently folded onto itself to form a cavity in which fiberglass rovings 58 and first fiberglass matt 60 are positioned (i.e., second fiberglass matt 80 surrounds fiberglass rovings 58 and first fiberglass matt 60).

Figure 4:
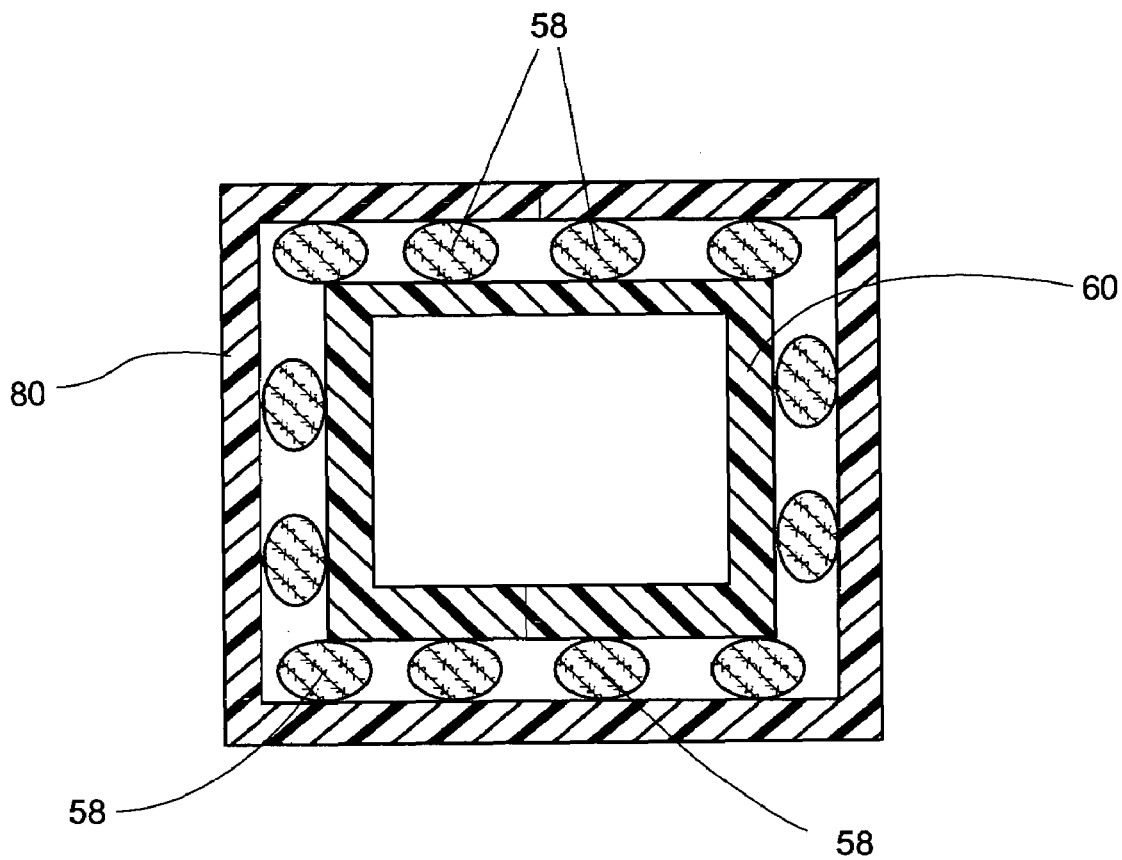
FIG. 4 is a cross-section illustrating a compound structure with resin-containing rovings positioned between first fiberglass matt and second fiberglass matt.

With reference to FIG. 4, a cross-section illustrating a compound structure with resin-containing rovings 58 positioned between first fiberglass matt 60 and second fiberglass matt 80 is provided. This compound structure is directed into forming chamber 86 which acts to form a preform shape corresponding to the cross-section of the final product. Additional liquid resin is optionally provided to forming chamber 86 via inlet 88. It should be appreciated that the preform shape will not, in general, have exactly the same dimensions of the final cross-section. Instead, only sufficient shaping for final curing in subsequent stages is performed within forming chamber 86 on first fiberglass matt 60 and second fiberglass matt 80 with the resin-containing rovings positioned in-between. Subsequently, the resin-containing rovings, the first fiberglass matt 60, and second resin-containing matt 80 are directed into curing section 54. Typically, curing section 54 comprises curing dies 90, 92. While the pultruded part moves through curing dies 90, 92 curing is accomplished with the final compression and shaping being applied to the pultruded structure. After emerging from curing section 54, the emerging compound structure 94 is cut at a desired length to form the reinforced article (e.g., the frame member).

Still referring to FIGS. 2 and 3, it should be appreciated that the methods of the invention, like all pultrusion methods are continuous in nature. During operation, the emerging compound structure 94 is pulled from curing section 54 which in turn causes first fiber matt 60, and second fiber matt 80 to be provided in a continuous fashion to preform section 52 and curing section 54. Pulling is typically achieved by a continuous belt system or a reciprocating clamping system. Emerging compound structure 94 emerges from curing section 54 at a predetermined linear speed. Typically, this predetermined linear speed is between about 1 ft/min to about 20 ft/min.

Figure 5B:
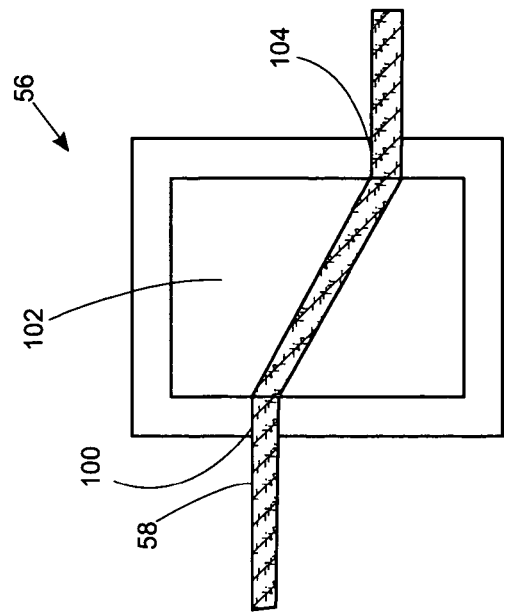
FIG. 5B is a cross-sectional view of a variation of the resin applicator of the invention.
Figure 5A:
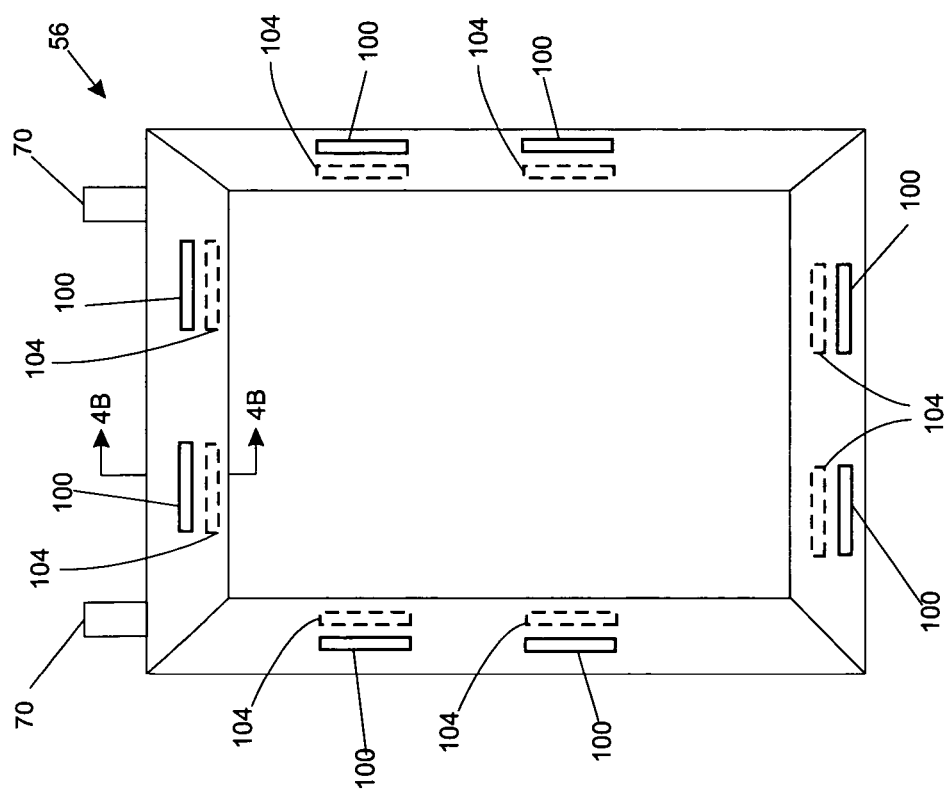
FIG. 5A is a front view of a variation of the resin applicator of the invention.

With reference to FIGS. 5A and 5B, illustrations of a variation of resin applicator 56 are provided. FIG. 5A is a front view, and FIG. 5B is a cross-sectional view of resin applicator 56. Resin applicator 56 contains the liquid resin which is applied to fiberglass rovings 58 as set forth above. Fiberglass rovings 58 enter resin applicator 56 via inlets 100. Typically, inlets 100 are slot-shaped. Resin located within cavity 102 is picked up by fiberglass rovings 58. Typically, the fiberglass rovings are saturated with the liquid resin. After picking up the resin, the rovings exit via exits 104 which are also typically slot-shaped. Contact by fiberglass rovings 58 with one or more of the surfaces that define inlets 100 and outlets 104 act to advantageously spread out fiberglass rovings 58. Such contact is enhanced by having inlets 100 vertically offset from outlets 104. It should be appreciated that although resin applicator 56 of the present invention is not air tight, the closed nature of this applicator offers substantial improvement over the open resin baths of the prior art.

Figure 6:
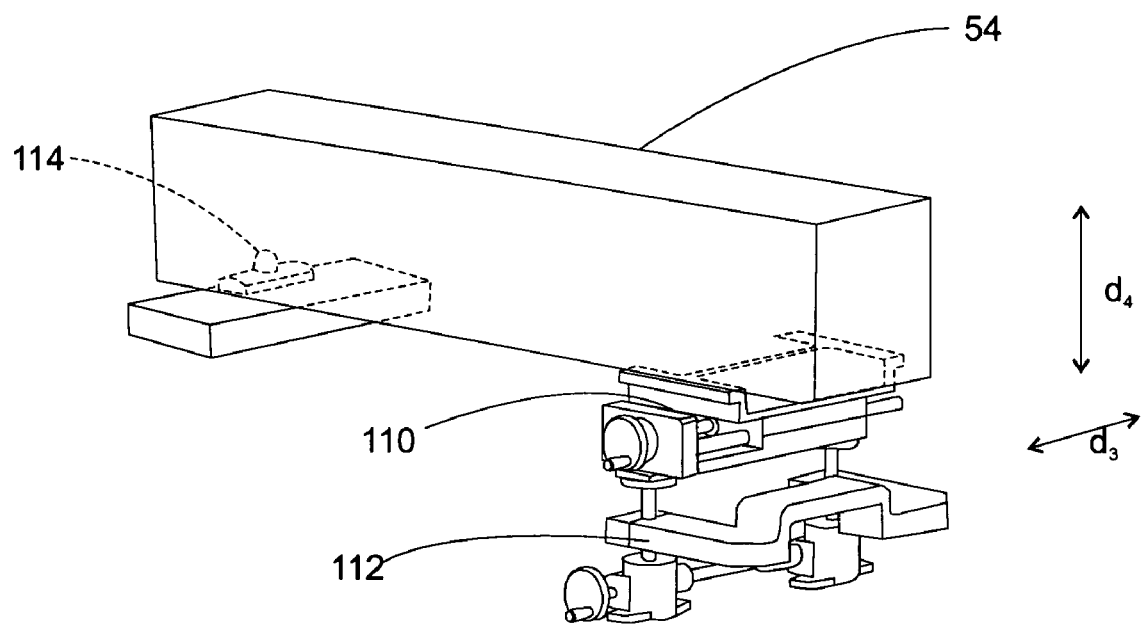
FIG. 6 is a perspective view of a mechanism for aligning the curing section to the preform section.

With reference to FIG. 6, a perspective view of a mechanism for aligning curing section 54 to preform section 52 is provided. Curing section 54 which includes dies 90, 92 is aligned along directions $d_3$ and $d_4$ via positioning devices 110, 112. Positioning device 110 moves curing section 54 about pivot point 114 along direction $d_3$ which is a horizontal direction normal to the direction at which material moves through pultrusion system 50. Positioning device 112 moves curing section 54 in vertical direction $d_4$ about pivot point 114.

As set forth above, liquid resin is applied at various stages of the methods of the invention. Such application occurs in resin applicators 56 and in forming chamber 86. Virtually any resin which is capable of curing in the time compatible with the linear speed of the process may be used. Typically, such resins are thermoset resins. A particularly useful example of a thermoset resin is an unsaturated polyester resin. Specific unsaturated polyester resins include resins based on maleic-anhydride, isophthalic acid, terephthalic acid, orthophthalic acid, dicyclopentadiene, and vinyl ester chemistries.

Figure 7:
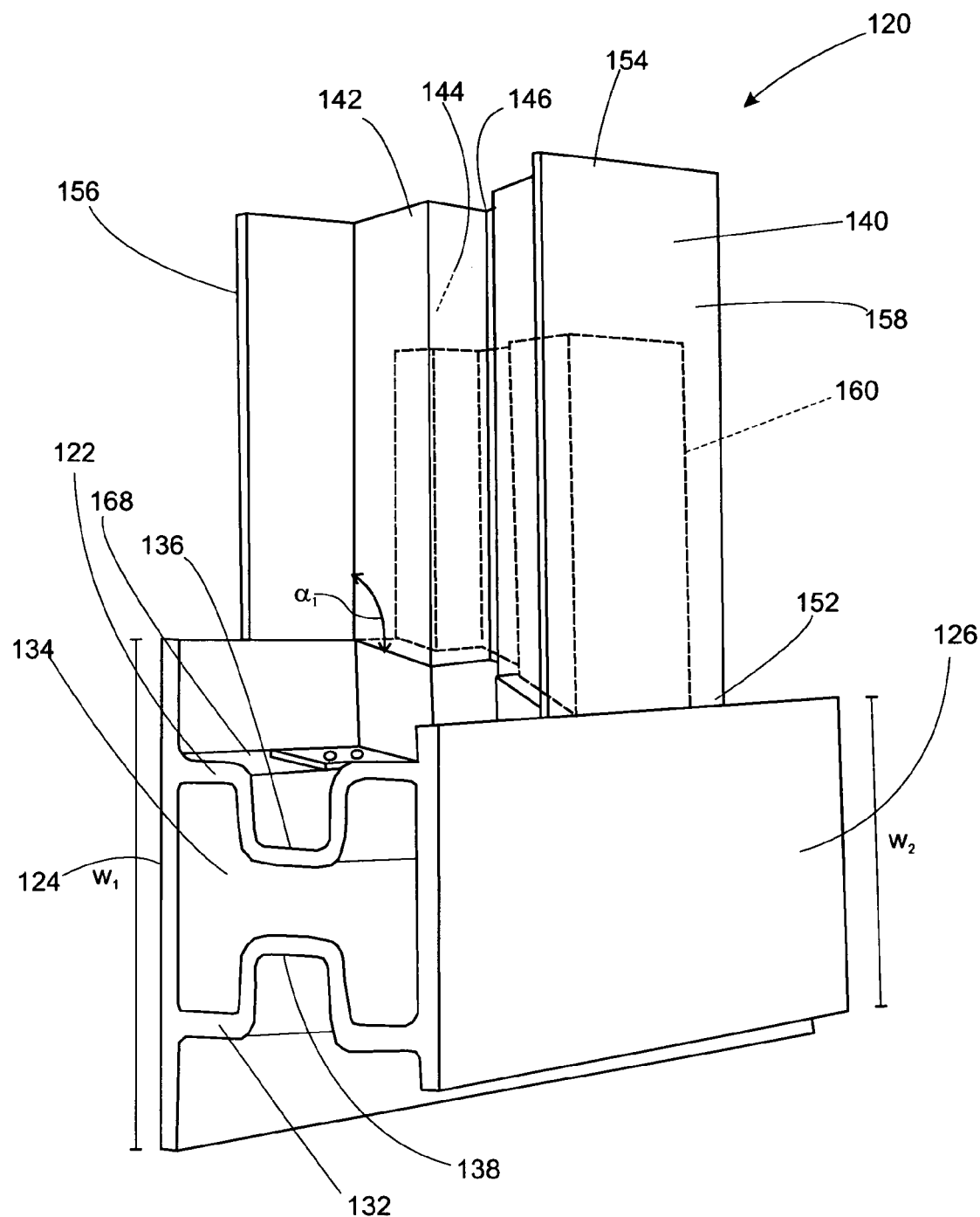
FIG. 7 is a perspective view of a variation of the joint of the present invention.

With reference to FIG. 7, illustration of an embodiment of a joint in which two frame members are connected together is provided. FIG. 7 is a perspective view of a variation of the joint of the present invention. Joint 120 attaches two frame members together. First frame member 122 includes a first substantially rectangular surface 124 which has first width $w_1$. Second substantially rectangular surface 126 has second width $w_2$. First width $w_1$ is greater than second width $w_2$. First frame member 122 includes wall 132 that defines interior cavity 134 and indentations 136, 138. Similarly, second frame member 140 includes wall 142 that defines interior cavity 144 and indentations 146. Moreover, second frame member 140 includes first end 152, second end 154, third substantially rectangular surface 156, and fourth substantially rectangular surface 158. First end 152 is angled relative to a plane perpendicular to the third substantially rectangular surface 156. First frame member 122 is connected to second frame member 140 via fastener 160. In a variation of this embodiment, second frame member 140 is of a similar design to first frame section 122 with third substantially rectangular surface 156 having a width that is greater than the width of a fourth substantially rectangular surface 158. Typically, interior cavity 134 and interior cavity 144 may be of rectangular cross-section or of a non-rectangular cross-section. Advantageously, the methods of the invention set forth above allow for complex cross-sections with protrusions and indentations being incorporated in the frame members. In a useful variation, one or both of frame members 122, 140 have a non-rectangular cross-section that is substantially I-shaped or H-shaped as set forth above. In still another variation, frame members 122, 140 have substantially the same cross-section.

Figure 8B:
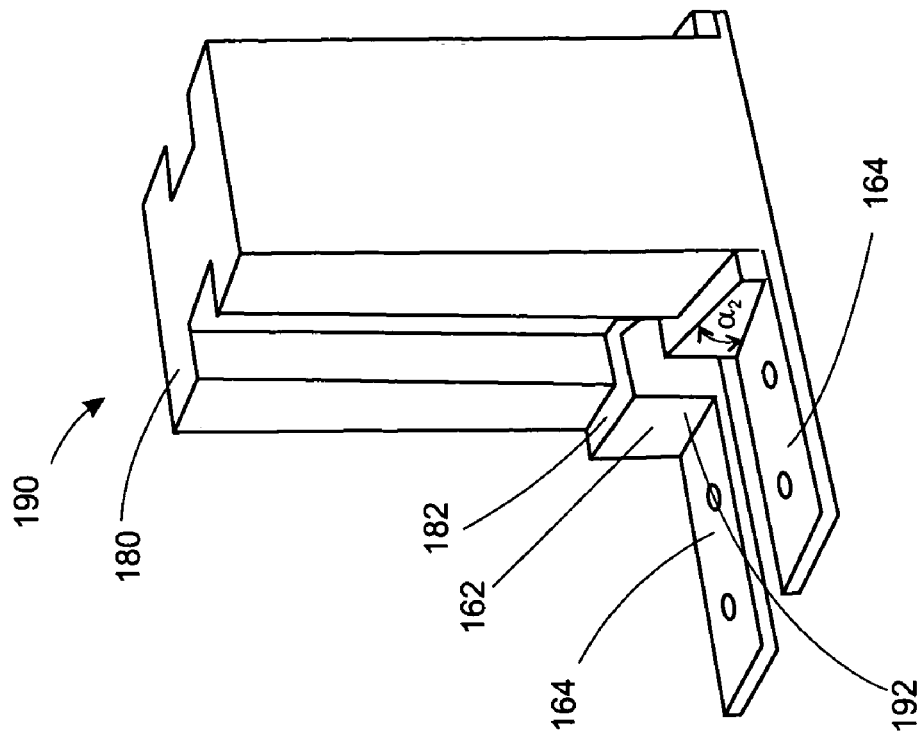
FIG. 8B is a perspective view of a fastener that connects the end of a second frame member to an end position on the side of a first frame member.
Figure 8A:
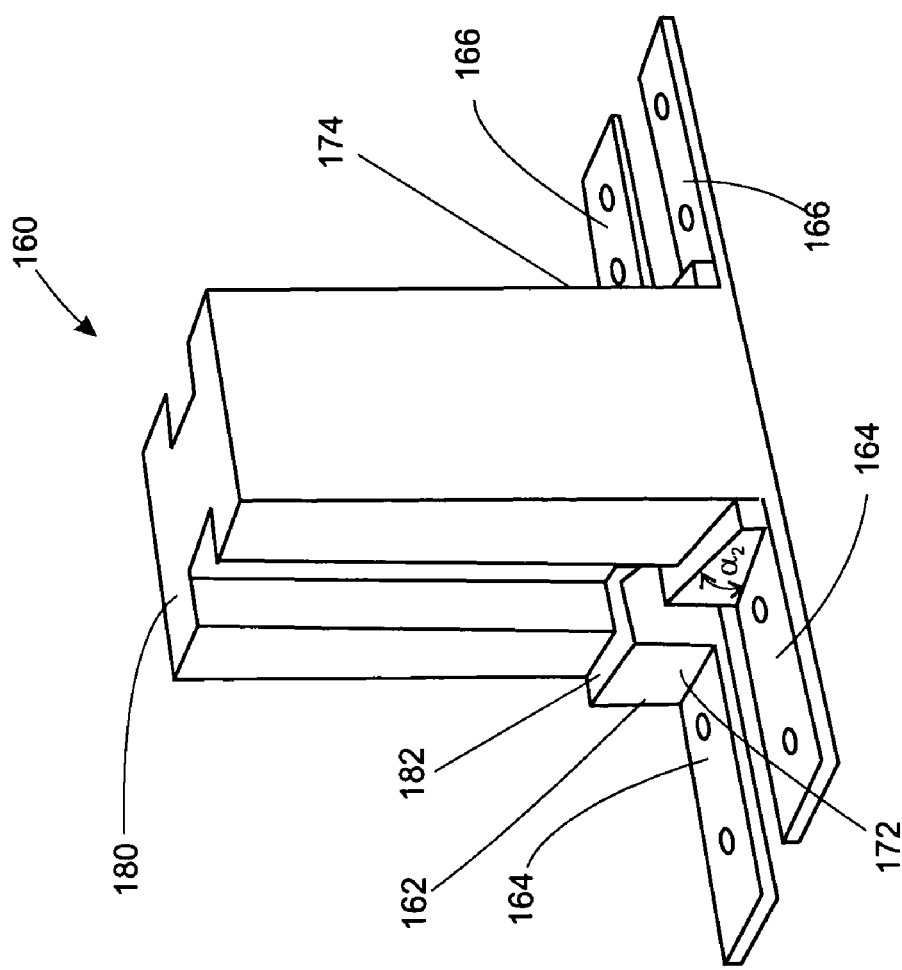
FIG. 8A is a perspective view of a fastener that connects the end of a second frame member to a central location on a side of a first frame member.
Figure 9:
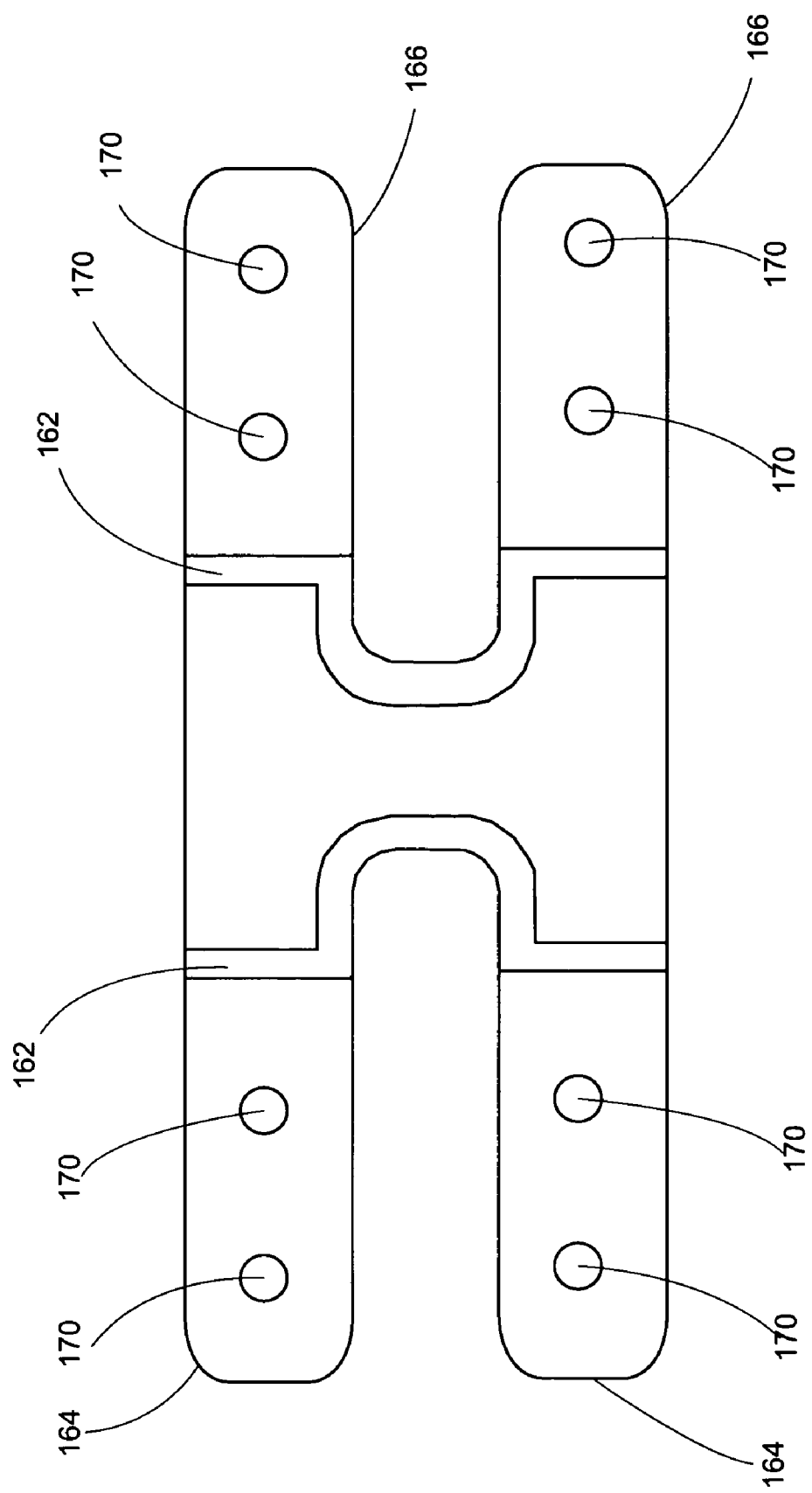
FIG. 9 is a top view of the fastener of FIG. 8A.

With reference to FIGS. 7, 8A, 8B, and 9, various views of fastener variations are provided. FIG. 8A is a perspective view of a fastener that connects the end of second frame member 140 to a central location on a side of first frame member 122. FIG. 8B is a perspective view of a fastener that connects the end of second frame member 140 to an end position on the side of first frame member 122. FIG. 9 is a top view of the fastener of FIG. 8A. Fastener 160 includes body section 162 and one or more flange sections 164, 166. Flange sections 164, 166 extend from body section 162. Flange sections 164, 166 attach to side 168 of first frame member 122. Attachment may be accomplished with bolts that are passed through holes 170. In the variation shown in FIG. 8A, fastener 160 includes flanges on both of sides 172, 174. Moreover, on each side two flanges sections are utilized to match the indented configuration of side 168. In another variation, a single flange section extending from each of sides 172, 174 is used. Fastener 160 also includes insert section 180 which extends from body section 162. In forming joint 120, insert section 180 is positioned within interior cavity 144 of second frame member 140. Insert section 180 has a cross-section that fits in and is complementary to the cross-section of second frame member 140. Fastener 160 further includes angled stop surface 182 defined by surface 184 of body section 162. Angled stop surface 182 is oriented at a mating angle $\alpha_2$ that matches (i.e., is complementary to) angle $\alpha_1$ of the second frame member 140. Accordingly, when insert section 180 is positioned within interior cavity 144, first end 152 is adjacent to angled stop surface 182.

With reference to FIG. 8B, a perspective view of a fastener that connects near the end of a side of the first frame member is provided. Again, fastener 190 includes body section 162 and one or more flange sections 164. Flange sections 164 extend from the body section 162. Flange sections 164 attach to side 168 of first frame member 122 except when this variation attachment is close to an end first frame member section 122. The flange section 164 only extends from a single side 192 of fastener 190. Fastener 190 also includes insert section 180 which extends from body section 162. Fastener 190 further includes angled stop surface 182 defined by surface 184 of body section 162. As set forth above, angled stop surface 182 is oriented at a mating angle $\alpha_2$ that matches (i.e., is complementary to) angle $\alpha_1$ of the second frame member 140. Accordingly, when insert section 180 is positioned within interior cavity 144 first end 152 is adjacent to angled stop surface 182.

Figure 10:
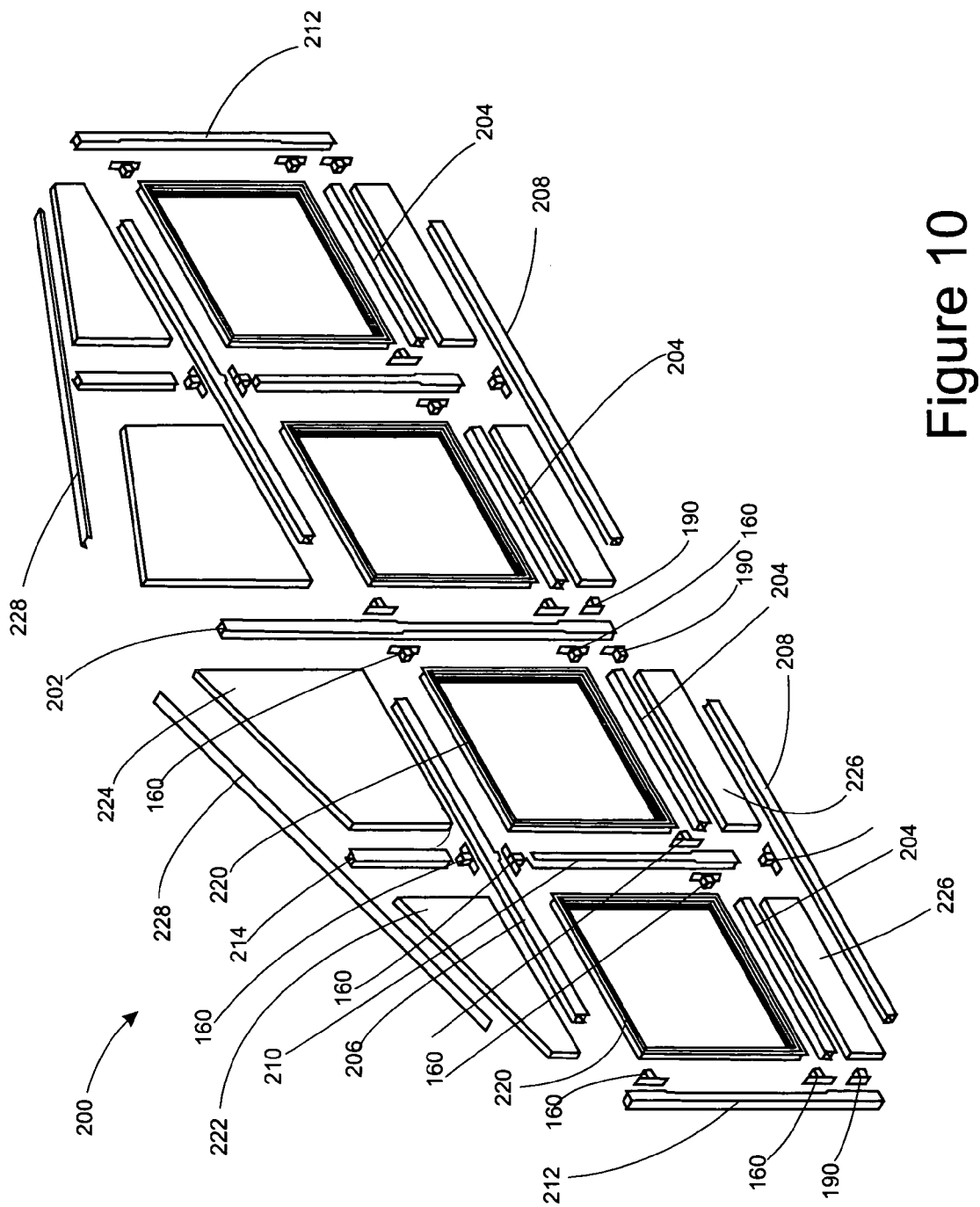
FIG. 10 is an exploded perspective view of a cathedral wall fabricated using one or more components of the present invention.
Figure 11:
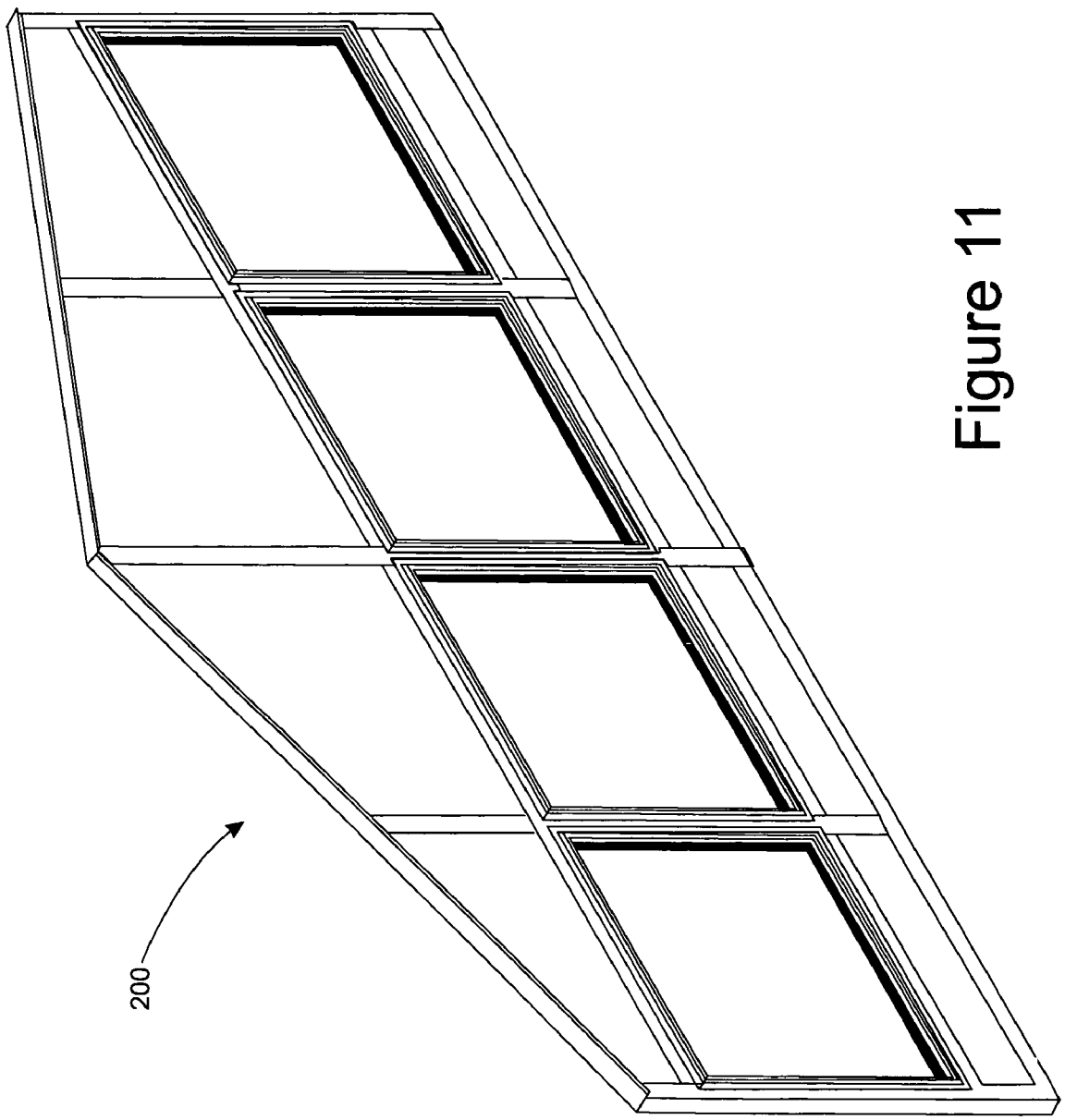
FIG. 11 provides a simple perspective view of a cathedral wall.

With reference to FIGS. 10 and 11, various views of a cathedral-type wall fastened together by the joint and fastener of the invention are provided. The frame members, joints, and fasteners of the invention are advantageously used to construct building enclosures such as patios, sunrooms, greenhouses and the like. FIG. 10 provides an exploded perspective view and FIG. 11 provides a simple perspective view of a cathedral wall. Such a wall is merely a representative example in that a multitude of enclosure designs using the components of the present invention are possible. Cathedral wall 200 includes center post 202 which is connected to window sills 204, headers 206, and floor starter 208 via fasteners 160, 190. Lower wall posts 210 are connected to header 206 and floor starter 208 via fasteners 160. Corner posts 212 are connected to header 206 and floor starter 208 via fasteners 160, 190. Also attached to header 206 is upper wall post 214. Cathedral wall 200 also includes window units 220, wing fills 222, 224, kick panels 226, and panel top cap 228.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of forming a fiberglass-plastic composite structure comprising:
   a) providing a plurality of fiberglass rovings to a resin applicator, the resin applicator having an inlet, an outlet, and a resin applicator cavity, the rovings entering the resin applicator through the inlet along a first direction and exiting through the outlet along a second direction such that the inlet and outlet are vertically offset and the first and second directions are vertically offset to spread out the rovings, the rovings being angled along a third straight line direction extending from the inlet to the outlet, the third direction being angled with respect to the first direction and second direction wherein the rovings are embedded with a liquid resin within the resin applicator cavity to form resin-containing rovings;
   b) directing at least a portion of the resin-containing rovings between a first fiberglass matt and a second fiberglass matt;
   c) directing the resin-containing rovings, the first fiberglass matt, and the second resin-containing matt into a curing chamber; and
   d) curing the resin-containing rovings positioned between the first and second fiberglass matts to form the fiberglass-plastic composite structure, wherein the fiberglass-plastic composite structure emerges from the curing chamber with a predetermined linear speed.

2. The method of claim 1 wherein prior to step c) the resin-containing rovings, the first fiberglass matt, and the second fiberglass matt are directed into a forming chamber to shape the resin-containing rovings, the first fiberglass matt, and the second fiberglass matt.

3. The method of claim 2 wherein liquid resin is introduced into the forming chamber.

4. The method of claim 2 wherein the first fiberglass matt is directed into the forming chamber via a first forming collar and the second fiberglass matt is directed into the forming chamber via a second forming collar.

5. The method of claim 2 wherein the resin-containing rovings, the first fiberglass matt, and the second fiberglass matt are shaped to define a central cavity.

6. The method of claim 5 wherein the resin-containing rovings, the first fiberglass matt, and the second fiberglass matt are shaped to define one or more indentations into the central cavity.

7. The method of claim 1 wherein the linear speed is from about 1 to about 20 ft/min.

8. The method of claim 1 wherein the rovings, the first fiberglass matt and the second fiberglass matt are pulled through the resin applicator.

9. The method of claim 1 wherein the rovings, are positioned relative to the first and second matts by one or more carding plates.

10. The method of claim 1 wherein an amount of reinforcements in the reinforced composite structure is greater than about 40% by weight.

11. The method of claim 1 wherein liquid resin comprises a thermoset resin.

12. The method of claim 1 wherein the inlet and the outlet are each independently slot-shaped.

13. The method of claim 1 wherein the curing chamber comprises a curing die.

14. The method of claim 13 wherein the curing die is positionable relative to the linear direction.

15. The method of claim 14 wherein the curing die pivots about a pivot point in a horizontal and a vertical direction.

16. The method of claim 13 wherein liquid resin comprises an unsaturated polyester resin.

* * * * *

UNITED STATES PATENT AND TRADEMARK OFFICE
CERTIFICATE OF CORRECTION

PATENT NO. : 7,597,771 B2 Page 1 of 1
APPLICATION NO. : 11/348806
DATED : October 6, 2009
INVENTOR(S) : Spaans et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 414 days.

Signed and Sealed this

Twenty-eighth Day of September, 2010

David J. Kappos
*Director of the United States Patent and Trademark Office*